United States Patent Office 3,716,624
Patented Feb. 13, 1973

3,716,624
NITRONIUM PERCHLORATE STABILIZED BY BF₃
John A. Brown, Berkeley Heights, N.J., assignor to
Esso Research and Engineering Company
No Drawing. Filed Dec. 24, 1964, Ser. No. 421,753
Int. Cl. C01b 11/18
U.S. Cl. 423—274    4 Claims This invention is concerned with the stabilization of the high-energy oxygen-oxidizer known as nitronium perchlorate by treatment of the substance with a small amount of boron trifluoride, BF₃.

This invention makes the handling and use of the nitronium perchlorate more practical from a stability standpoint, because prior to this invention no other effective stabilizers have been known.

Nitronium perchlorate is one of the most potent oxidizers known for solid rocket propellant compositions. The empirical formula of nitronium perchlorate has been shown to be NClO₆ and the electronic molecular structure has been considered to be the following:

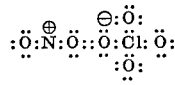

The name nitronium perchlorate is the present commonly used name of the commercial product, although previously it was called nitryl perchlorate or nitroxyl perchlorate, as in the article of W. E. Gordon and J. W. Spinks, in the "Canadian Journal of Research," volume 18B, pages 35–8362 (1940). In this article the method of preparation described involves ozonizing dry air to form oxides of nitrogen and O₃ and mixing the resulting gases with dry chlorine dioxide.

Another, improved, method for preparing nitronium perchlorate is described in U.S. application Ser. No. 6,319 filed Feb. 2, 1960, now U.S. Pat. No. 3,558,456 which involves mixing chlorine dioxide with ozone in controlled amounts and then adding to the resulting gaseous mixture a controlled amount of nitrogen tetroxide so as to obtain a solid white nitronium perchlorate of high purity.

Nitronium perchlorate has to be used with certain precautions because it reacts very rapidly with many organic compounds, for example, explosively with benzene and unsaturated hydrocarbons. It reacts rapidly with alcohols. It can be mixed with or coated by various substances with which it is not reactive except at high temperatures, as for example, certain paraffin waxes, aluminum, certain saturated hydrocarbon polymers and certain halogen substituted hydrocarbon polymers. The white fine crystals of nitronium perchlorate may be compressed into grains having a density above 2.2 grams per cc. and the compressed grains may then be coated for protection. However, even when the nitronium perchlorate is given a protective coating, it tends to decompose slowly under ordinary temperature conditions and rapidly at higher temperatures; and therefore it is desirable to have an effective stabilizer to minimize the decomposition.

Studies show that the decomposition of nitronium perchlorate is of the autocatalytic type in that the rate of decomposition tends to increase rapidly over a period of hours at a moderately elevated temperature, e.g., 60° C. Vacuum stripping produces, e.g., 16 hours at 40° C. and 10⁻⁴ mm. pressure, improve the stability; but even such vigorous treated material still shows some residual instability.

In the present invention, it has been demonstrated that a small amount of BF₃ is an effective additive for stabilizing nitronium perchlorate, NO₂ClO₄.

EXAMPLE 1

100 mg. of vacuum-dried NO₂ClO₄ were placed in a glass bulb attached to a manometer, and the bulb was evacuated to 10⁻⁴ mm. Hg. The apparatus was placed into an oven at 60° C. and the pressure of the evolved decomposition gases was measured periodically. A second sample was treated in the same way except that 10 mm. pressure of BF₃ was added to the bulb after evacuation. A third sample was exposed to BF₃ for one hour, then the bulb was evacuated to 10⁻⁴ mm. Hg.

| | Gas evolved, cc./gm. NO₂ClO₄ | | |
|---|---|---|---|
| | NO₂ClO₄ control | NO₂ClO₄ plus 10 mm. BF₃ | NO₂ClO₄ treated with BF₃ and evacuated |
| Hours at 60° C.: | | | |
| 0 | 0 | 0 | 0 |
| 25 | 1 | 0.1 | 0.6 |
| 50 | 1.5 | 0.1 | 1.0 |
| 75 | 2.3 | 0.2 | 1.1 |
| 100 | 3.8 | 0.2 | 1.3 |
| 125 | ¹ 7.0 | 0.2 | ² 1.5 |
| 150 | | 0.4 | |
| 200 | | 0.5 | |
| 300 | | 0.8 | |

¹ Discontinued—curve rising vertically.
² Discontinued—curve nearly horizontal.

In the above example, the NO₂ClO₄ was carefully dried before treatment and testing, a process which improves its stability. The commercial product, without drying, is much less stable than the dried material and evolves 10+ cc./gm. of gas in 25 to 50 hours at 60° C. However, BF₃ treatment of the undried commercial product yields a stabilized material comparable to that obtained from dried, BF₃-treated material; so that BF₃ treatment is actually most effective and useful on NO₂ClO₄ of poorer initial stability. The better the NO₂ClO₄ initally, the less an additive can improve it.

Variations may be made in the BF₃ gaseous treatment of the nitronium perchlorate to insure that the BF₃ becomes fully contacted with the surfaces of the nitronium perchlorate crystals, such as the use of pressure and a cyclic treatment of gas evacuation and BF₃ pressure.

The amount of BF₃ used for the stabilizing treatment of nitronium perchlorate may be as small as a trace amount, e.g., 100 p.p.m. or any higher amount. The trace amount of BF₃ which may remain with the nitronium perchlorate crystals may be adsorbed thereon and such small amounts will not interfere with the uses of the nitronium perchlorate as an oxidizer.

It will be understood that the BF₃ stabilizing treatment may be made with various other components present for enhanced stability or improving the utility of the nitronium perchlorate.

BF₃ treatment may be applied with advantage to pelletized NO₂ClO₄, either before or after pelletizing, and before coating with protective films. The following data were obtained:

| Sample | Cc./gm./100 hrs./60° C. | Hydrolysis test |
|---|---|---|
| "Reta" coated NP pellets | 7.0 | Fails after 1 to 2 days. |
| "Reta" coated BF₃-treated NP pellets. | 4.5 | (Not run). |
| "Reta" coated pellets made from BF₃-treated NP powder. | 2.0 | Passes after >7 days. |

NOTE.—"Reta"=proprietary halogenated hydrocarbon coating polymers. The "hydrolysis test" consists of placing the coated pellets into water and noting the time required to generate an acid reaction. NP is nitronium perchlorate.

Usually about 0.01 to 1 weight percent of the BF₃ stabilizer is an effective stabilizing amount, but the amount may be varied depending on the circumstances, e.g., use of the stabilizer for storage after which most of the stabilizer may be removed.

The invention described is claimed as follows:

1. Nitronium perchlorate stabilized by the presence of an effective stabilizing amount of $BF_3$.

2. Nitronium perchlorate crystals treated with $BF_3$ and pelleted by compression.

3. The method of storing nitronium perchlorate with stabilization against thermal decomposition which comprises placing the nitronium perchlorate under an atmosphere of gaseous $BF_3$.

4. Nitronium perchlorate pellets stabilized by contact with gaseous $BF_3$.

References Cited

UNITED STATES PATENTS 3,186,790   6/1965   Brown et al. _____ 23—85 X
3,244,474   4/1966   Schoenfelder et al. ____ 23—85

LELAND A. SEBASTIAN, Primary Examiner

U.S. Cl. X.R.

149—7, 22, 75; 423—386